United States Patent Office 3,547,983
Patented Dec. 15, 1970

3,547,983
PREPARATION OF UNSATURATED ESTERS
Henry O. Mottern, Far Hills, and Victor A. Sims, Bayonne, N.J., assignors to Air Reduction Company, Incorporated, New York, N.Y., a corporation of New York
No Drawing. Filed June 29, 1967, Ser. No. 653,599
Int. Cl. C07c *67/00, 69/14*
U.S. Cl. 260—488
7 Claims

ABSTRACT OF THE DISCLOSURE

Vinyl acetate is produced from ethane, acetic acid and oxygen.

---

This invention relates to the production of organic compounds, particularly unsaturated esters of organic acids. More specifically this invention relates to an improved method for the preparation of unsaturated esters of acetic acid, especially vinyl acetate.

In recent years there has been a substantial increase in the demand for unsaturated esters of organic acids, particularly vinyl acetate in a variety of fields such as the preparation of polymers, copolymers and resins from these polymers. In addition, these esters have been finding increased application in the synthesis of drugs and as chemical intermediates, such as acetylating agents. The increased demands have led to many attempts to produce these esters in high yields by economical and efficient processes. While it is not limited thereto, the present invention will be discussed and illustrated by the preparation of vinyl acetate.

Vinyl acetate has been prepared commerically by the addition of acetic acid to acetylene in the presence of catalysts such as mercurial salts. It has also been prepared by conversion of ethylene to acetaldehyde by known methods and then adding acetic anhydride thereto to form ethylidene diacetate which can then be split to give vinyl acetate and acetic acid. The method starting from acetylene is fairly expensive due to the relatively high cost of the initial material. The method starting from ethylene involving conversion to acetaldehyde, addition thereof to acetic anhydride and then splitting the addition product to form vinyl acetate and acetic acid has the distinct disadvantage of being a multi-stage process.

In the last few years, new liquid and gas phase processes oxyacetylation processes for the conversion of ethylene to vinyl acetate have been developed. Interest in the ethylene oxyacetylation route lies principally in the fact that ethylene is a lower cost feed stock than acetylene used in prior commercial processes for the production of vinyl acetate. Since the cost of ethane is only a fraction of that of ethylene it would be more attractive economically than ethylene as a base for vinyl monomer synthesis.

It is the object of this invention to provide a new method for preparing vinyl monomers.

It is a further object of this invention to prepare vinyl esters, particularly vinyl acetate, using ethane as the hydrocarbon feed stock.

These and other obects will appear more clearly from the detailed specification which follows.

It has now been found that ethane can be converted to vinyl acetate by treatment in an oxyacetylation atmosphere such as acetic acid vapor and oxygen or air at elevated temperatures and in the presence of certain catalysts. The overall stoichiometric relationship for this reaction can be written as:

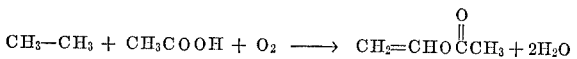

Since ethane is relatively inert as shown by the fact that thermal oxidation of ethane requires temperatures well above 350° C. in a flow system and acetic acid and acetate derivatives are heat sensitive at such temperatures it is surprising and unexpected that conversion of ethane to vinyl acetate in a single stage oxyacetylation process can be obtained.

In the process in accordance with the present invention, the feed stream to the oxyacetylation reaction zone comprises ethane, acetic acid and oxygen, ordinarily as air. While the reactants can be used in equimolar ratios, it is also possible to charge ethane and/or acetic acid in greater amounts, for example 1 to 60 moles of ethane and/or 1 to 15 moles of acetic acid per mole of oxygen.

The oxyacetylation reaction is carried out at temperatures of from about 100° to about 400° C., preferably at about 125° to 200° C. and at pressures of from atmospheric to about 5000 p.s.i.g., preferably substantially atmospheric, e.g. 0–20 p.s.i.g.

Catalysts which are effective in promoting the reaction of the ethane-acetic acid-oxygen mixture are hydrogenation-dehydrogenation catalysts such as chromia-alumina, and the Group VIII metals, oxidizing catalysts such as the salts, e.g. chlorides and acetates of the Group VIII metals, alone or in combination with Group 1–B metal salts, such as copper-palladium-iron salts. The above catalysts may be supported on a suitable substrate such as alumina or silica containing materials which may be of synthetic or natural origin, such as silica gel, alumina, clays, e.g. Celite. The chromia-alumina catalyst is, in effect, chromia supported on alumina. These substrates may function as dehydration catalysts to aid the reaction.

A number of experiments were conducted to demonstrate the feasibility of the conversion of ethane to vinyl acetate. The reaction system consisted of a 1 in. (OD) Pyrex tube with a 28 in. long heated segment. The upper portion of the tube was used as the mixing and preheating zone and was packed with 6 mm. Pyrex glass beads. The lower section contained the fixed catalyst bed and the tube was mounted in an electrically heated furnace of 1 in. (ID) and of 500 watt capacity. Temperature control was provided by means of an internal sliding thermocouple attached to a Gardsman.

The various gaseous feed streams were measured through suitable rotameters and flow was controlled by two-stage, pressure-regulating valves and two needle valves. Acetic acid vapor was introduced by "carburation" in which the ethane feed was passed through a flask containing acetic acid at a preset temperature. The reactant feed lines were attached to the upper end of the reaction tube.

The bottom of the reactor tube was attached to the condensing system, which consisted of two receivers cooled by water condensers and are receiver cooled by a Dry Ice condenser. From the last condenser, the noncondensibles passed through a water-scrubber and then at this point the effluent stream was sampled for gas chromatography analysis, first for low boiling components, and then for liquid condensates and water-scrubber components. A de-mister and Drierite tower were used to remove water vapor before analysis of the gases in the first chromatograph. The scrubbed exit gases were passed through a wet test meter to measure total off gas per run.

The following examples are illustrative of the present invention.

EXAMPLE I 100 cc. of a commercial chromia-alumina dehydrogenation catalyst (Harshaw Cr—1403) containing 19% $Cr_2O_3$ in the form of green pellets (½ in.) with a reported surface area of 100 sq. m. per gram was charged to the lower portion of the vertical reaction tube and the remaining top portion was packed with the Pyrex glass beads. The catalyst was activated in a gas stream (nitrogen, ethane or air) and the bed temperature adjusted to the minimum reaction temperature whereupon the air, ethane and acetic acid feeds were metered into the top of the reactor tube. During the equilibration period, the gas chromatography units were adjusted to analytical conditions. After one hour of reaction, a measured run was started. Results were based on GC readings taken at ½ or 1 hr. intervals. Bed temperature was gradually increased with time to observe any formation of vinyl acetate (ViOAc) or end products such as acetaldehyde (AcH), ethyl acetate, (EtOAc), ethylidine diacetate [$CH_3CH(OAc)_2$] or ethylene. When the bed temperature reached the point where combustion products ($CO_2$, CO and $H_2O$) predominated, the run was shut down in nitrogen. Besides temperature effect, feed-rate and feed-ratios could be readily adjusted while observing the immediate effect of these changes by GC. At the end of each run the water-scrubbers and condensates were analyzed for components other than $H_2O$ and HOAc. Based on GC analyses of gases and liquids, volume of gas fed in, weight of recovered condensate, and the total volume of off-gas, a semiquantitative interpretation of the results was made and an approximate materials balance obtained.

Using an equimolar ratio of $C_2H_6$:HOAc:$O_2$, bed temperature was gradually raised from 200–300° C. Major products in this temperature range were $H_2O$, $CO_2$ and CO. Smaller peaks for HCHO, AcH, ViOAc and acetone were obtained. A maximum of 3% of the ethane feed was used, and the conversion to ViOAc amounted to about 0.1% per pass. At higher reaction temperatures (270–380° C.) and using an excess of acetic acid in the feed, the results were similar, except for a greater $CO_2$ production. Two runs were made using acetic anhydride in place of acetic acid and studying the effect of temperature from 200–470° C. At the higher temperatures, thermal degradation of acetic anhydride becomes pronounced and the vinyl acetate conversion was not improved using acetic anhydride in place of acetic acid. It ran about 0.04% per pass.

EXAMPLE II

A catalyst was prepared by dissolving 20.0 g. $CuCl_2$, 2.5 g. $PdCl_2$ and 2.5 g. $FeCl_3$ in dilute aqueous HCl and then adding the solution to 170 g. of a Celite catalyst support. (Johns-Manville ⅛ in. pellets, 150 cc.). The catalyst was dried in an air oven at 85° C. for 18 hours. 194 g. of catalyst was obtained which contained 10.3% $CuCl_2$, 1.3% $PdCl_2$ and 1.3% $FeCl_3$ by weight. This catalyst, an example of an oxidizing catalyst, was charged to the bottom of a vertical reaction tube and the upper portion was filled with Pyrex glass beads. A number of test runs were made as in Example I. An excess of ethane was used in these runs at 100–225° C. bed temperatures. Besides the feed gases, no other major GC peaks were observed; $CO_2$, CO, water, acetone and ViOAc were the only products indicated and in small amounts (1 or 2% of the ethane feed). Vinyl acetate formation amounted to a 0.04% conversion of the oxygen feed per single pass. Because of the low amount of by-product, reactants can be continuously recycled to increase ViOac production.

EXAMPLE III

The catalyst of Example II was heated in air to 250° C., cooled to 130° C. in nitrogen and then reduced in hydrogen at 160° C. for 4 hours. The catalyst bed was then heated to 300° C. in hydrogen for 8 hours more. During the reduction process, 0.10 mole of HCl was recovered in the water-scrubbers (for complete reduction, theoretical yield of HCl is 0.17 mole). A number of test runs were made as in Example I using the resultant Cu-Pd-Fe on Celite catalyst. Several differences in results were observed: a much larger amount of water was produced (probably in part via oxidation of chemisorbed hydrogen on Pd metal); and ViOAc conversion increased to 0.4% or 10 times that obtained using the unreduced catalyst. In a run using 1% HCl in the feed stream as a possible promoter or catalyst, no improvement was observed.

From the above data it appears that it is possible to produce vinyl acetate selectively by the oxyacetylation of ethane using certain hydrogenation-dehydrogenation catalysts, Cu-Pd oxidation type catalysts, dehydration, and acidic type systems. It will be understood that this invention is not limited to these specific examples since numerous variations are possible without departing from the scope of the following claims.

We claim:
1. A process for the production of vinyl acetate which comprises contacting ethane, acetic acid and oxygen in the vapor phase with a catalyst selected from the group consisting of chromia-alumina, palladous salts, palladium chloride-cupric chloride-ferric chloride and metallic palladium-copper-iron, at temperatures of from about 100 to about 400° C. at pressures of from substantially atmospheric to about 5000 p.s.i.g.

2. The process as defined in claim 1 wherein the catalyst is chromia-alumina.

3. The process as defined in claim 2, wherein the temperature is between about 125 and 275° C.

4. The process as defined in claim 1 wherein the catalyst consists essentially of the chlorides of copper, palladium and iron deposited on a support selected from the group consisting of silica gel, diatomaceous earth and alumina.

5. The process as defined in claim 4 wherein the temperature is between about 125 and 275° C.

6. The process as defined in claim 1 wherein the catalyst consists essentially of metallic copper, palladium and iron deposited upon a diatomaceous earth substrate.

7. The process as defined in claim 6 wherein the temperature is between about 125 and 275° C.

References Cited

UNITED STATES PATENTS

| | | | |
|---|---|---|---|
| 2,374,404 | 4/1945 | Ahlberg | 260—683 |
| 2,431,485 | 11/1947 | Keeling | 260—683 |
| 2,804,488 | 8/1957 | Cobb Jr. | 260—683 |
| 3,190,912 | 6/1965 | Robinson | 260—497 |
| 3,300,528 | 1/1967 | Wakasa et al. | 260—497 |

LORRAINE A. WEINBERGER, Primary Examiner

V. GARNER, Assistant Examiner

UNITED STATES PATENT OFFICE
CERTIFICATE OF CORRECTION

Patent No. 3,547,983          Dated December 15, 1970

Inventor(s) Henry O. Mottern and Victor A. Sims

It is certified that error appears in the above-identified patent and that said Letters Patent are hereby corrected as shown below:

Col. 1, line 62, "obects" should read -- objects --.

Col. 2, line 55, "are" should read -- one --.

Col. 3, line 64, "V10ac" should read -- V10Ac --.

SIGNED AND
SEALED
MAR 16 1971

(SEAL)
Attest:

Edward M. Fletcher, Jr.
Attesting Officer

WILLIAM E. SCHUYLER, JR
Commissioner of Patents

FORM PO-1050 (10-69)

USCOMM-DC 60376-